(12) United States Patent
Vasudevan

(10) Patent No.: US 7,926,929 B2
(45) Date of Patent: Apr. 19, 2011

(54) SYSTEM AND METHODS FOR PRODUCING COMPOSITE COLORS HAVING IMPROVED SATURATION USING PIGMENT-BASED INKS ON GENERIC MEDIA

(75) Inventor: Sundar Vasudevan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 893 days.

(21) Appl. No.: 11/698,246

(22) Filed: Jan. 24, 2007

(65) Prior Publication Data

US 2008/0176001 A1    Jul. 24, 2008

(51) Int. Cl.
*C09D 11/00* (2006.01)
(52) U.S. Cl. .................. 347/100; 106/31.13; 106/31.28
(58) Field of Classification Search ................... 347/100; 106/31.13, 31.28
See application file for complete search history.

(56) References Cited

U.S. PATENT DOCUMENTS

| | | | |
|---|---|---|---|
| 4,387,382 A | 6/1983 | Kohashi | |
| 5,454,864 A | 10/1995 | Walen-Shaw | |
| 6,172,693 B1 | 1/2001 | Minemoto et al. | |
| 6,331,047 B1 | 12/2001 | Muramatsu et al. | |
| 6,724,520 B2 | 4/2004 | Kawai | |
| 2002/0063673 A1 | 5/2002 | Kawai | |
| 2006/0203056 A1* | 9/2006 | Furukawa et al. | 347/96 |
| 2007/0252880 A1 | 11/2007 | Vasudevan | |

FOREIGN PATENT DOCUMENTS

| | | |
|---|---|---|
| EP | 0962319 A2 | 8/1999 |
| EP | 1195603 A2 | 4/2002 |
| JP | 57-040268 | 3/1982 |
| JP | 10-329324 | 12/1998 |
| JP | 11-000991 | 1/1999 |
| JP | 2003-039810 | 2/2003 |
| JP | 2005154767 A * | 6/2005 |
| JP | 2005-262641 | 9/2005 |
| WO | 03/044102 A1 | 5/2003 |
| WO | 2007/067686 A1 | 6/2007 |

* cited by examiner

*Primary Examiner* — Laura E Martin

(57) ABSTRACT

A printing system has a substrate, and first and second colored inks. The first colored ink has particles of a first pigment, and the particles have a first net zeta potential. The second colored ink has particles of a second pigment and a polarity-reversing amount of a surfactant. The particles of the second pigment have a second net zeta potential opposite in polarity to the first net zeta potential. The first and second colored inks are configured to be printed together over a common surface of said substrate to form a composite color.

12 Claims, 3 Drawing Sheets

SYSTEM AND METHODS FOR PRODUCING COMPOSITE COLORS HAVING IMPROVED SATURATION USING PIGMENT-BASED INKS ON GENERIC MEDIA

BACKGROUND

The present disclosure relates to pigment-based inks. More specifically, it relates to composite colors printed on media using pigment-based inks.

Pigment-based inks are often preferred over dye-based inks in applications requiring longevity and permanence. Pigment-based inks generally incorporate a plurality of tiny solid pigment particles having the color specified by the ink in a liquid vehicle. The pigment particles are insoluble, thereby providing a colored ink with better water fastness than dye-based inks. The aforementioned liquid vehicle in pigment inks is often an aqueous solution.

As pigment particles in a purely aqueous liquid vehicle tend to flocculate or clump together, pigments for ink formulation are commonly available in dispersions. In this context, dispersions are aqueous solutions containing pigment particles treated with a dispersing agent that greatly reduces the tendency of pigment particles to attract each other.

Electrostatic dispersants are one form of dispersing agent. Electrostatic dispersant particles have either a net positive or net negative charge and adhere to the surface of the pigment particles through adsorption, causing a thin layer of dispersant particles to form on the majority of the surface of each pigment particle. This layer in turn polarizes the surface of the pigment particles with either a net positive or net negative zeta potential, according to the polarity of the charge of the dispersant particles. As like charges repel each other, the pigment particles repel each other and are dispersed substantially evenly throughout the liquid vehicle.

In aqueous solutions, electrostatic dispersants provide far greater stability to pigment dispersions than other available dispersing agents such as steric dispersants. Thus electrostatic dispersants are optimal in many applications requiring pigment-based inks. Electrosteric dispersants take advantage of both electrostatic stabilization and steric stabilization simultaneously.

One particular challenge posed with the use of pigment-based inks is encountered when printing two or more colored inks together to form a composite color. On many substrates, one example being plain paper, composite colors formed from pigment-based inks exhibit poor color saturation or richness. Attempts to improve plain paper composite color saturation of pigment inks include over or under printing with a fixer ink. However this approach requires the use of a separate fixer pen, and can increase printing costs. Other attempts at improving composite color saturation of pigment inks involve the use of specially treated print media. Such media are generally expensive, and it is often preferred that a project be printed on generic media such as plain paper.

SUMMARY

A printing system has a substrate, and first and second colored inks. The first colored ink has particles of a first pigment, and the particles have a first net zeta potential. The second colored ink has particles of a second pigment and a polarity-reversing amount of a surfactant. The particles of the second pigment have a second net zeta potential opposite in polarity to the first net zeta potential. The first and second colored inks are configured to be printed together over a common surface of said substrate to form a composite color.

A method of printing a composite color with enhanced color saturation, includes printing first and second colored inks together, the first colored ink having a first polarity and the second colored ink comprising a polarity-reversing amount of a surfactant such that the second colored ink comprises a second polarity opposite to said first polarity.

A method of preparing a colored ink for use in printing composite colors includes providing an aqueous dispersion of pigment particles having a first net zeta potential; and adding a surfactant to the dispersion in a polarity-reversing amount such that the pigment particles obtain a new second net zeta potential opposite in polarity to the first net zeta potential.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
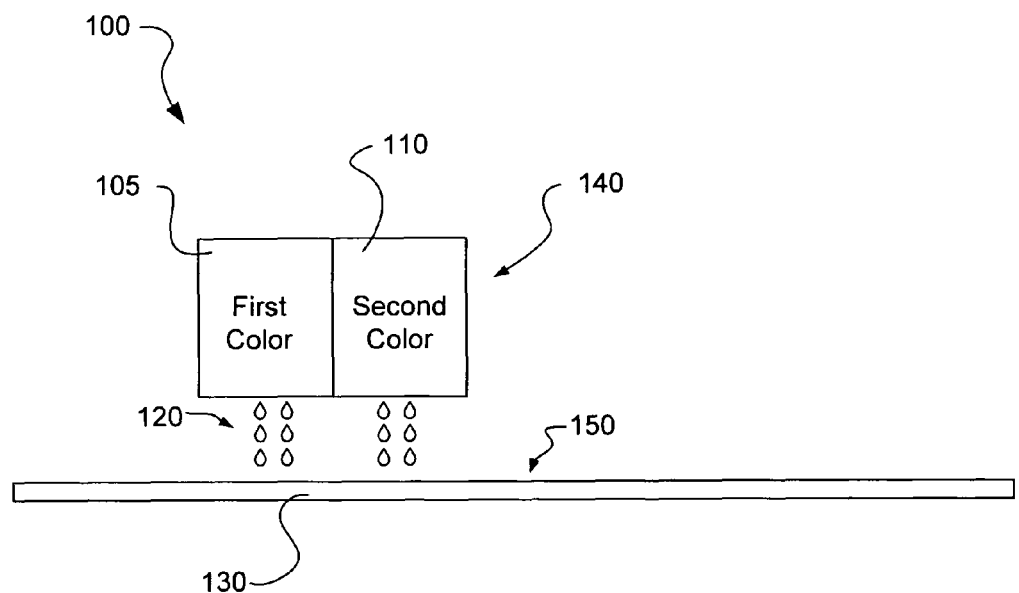
FIG. 1 is a diagram of an exemplary embodiment of a printing system according to principles described herein.

The present specification describes an exemplary system and methods for printing composite colors using pigment-based inks, the composite colors exhibiting enhanced color saturation on generic media.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a percentage range of approximately 1% to about 20% should be interpreted to include not only the explicitly recited percentage limits of 1% to about 20%, but also to include individual percentages such as 2%, 3%, 4%, and sub-ranges such as 5% to 15%, 10% to 20%, etc.

As used in the present specification and the appended claims, the term "composite color" refers to a color formed by mixing on a print medium at least two differently colored inks that combine to form a third, composite color.

As used in the present specification and the appended claims, the term, "zeta potential" refers to the electrostatic potential generated by the accumulation of ions at the surface of a colloidal particle, such as a pigment particle. The term "net zeta potential" as used herein refers to the mean zeta potential value of a plurality of colloidal particles. Zeta potential measurements may be characterized as having a positive or a negative polarity.

As used in the present specification and the appended claims, the term "color saturation" refers to the ratio of C*/L*, where C* is defined as the chroma value and L* is defined as the lightness value measured in CIELAB color space.

As used in the present specification and the appended claims, the term "liquid vehicle" or "ink vehicle" refers broadly to the vehicle in which a pigment or dye is placed to form an ink. Liquid vehicles may include solvents, cosolvents, buffers, biocides, sequestering agents, viscosity modifiers, surface-active agents, chelating agents, resins, water, and combinations thereof.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The present specification describes an exemplary printing system that includes a substrate and first and second colored inks. The first colored ink comprises particles of a first pigment comprising a first net zeta potential. The second colored ink comprises particles of a second pigment and a polarity-reversing amount of a surfactant, such that the particles of the second pigment comprise a second net zeta potential opposite in polarity to the net zeta potential of the particles of the first pigment. The first and second colored inks are configured to be printed together over the substrate to form a composite color. Consequently, this exemplary system provides an efficient, cost-effective solution for printing composite colors from pigment-based inks having pigment particles of opposite polarities.

The present specification also describes a method of printing a composite color with enhanced color saturation by printing first and second colored inks together. The first colored ink has a first polarity and the second colored ink has a polarity-reversing amount of a surfactant such that the second colored ink has a second polarity opposite to said polarity.

The present specification also describes a method of preparing a colored ink for use in printing composite colors by providing an aqueous dispersion of pigment particles having a first zeta potential and adding a surfactant to said dispersion in a polarity-reversing amount. The pigment particles obtain a new second net zeta potential opposite in polarity to the first net zeta potential.

Referring now to FIG. 1, an exemplary printing system (100) according to the principles described herein is shown. The printing system (100) comprises a substrate (130) configured to receive droplets (120) of a first colored ink (105) and a second colored ink (110). The substrate (130) may be formed of any number of materials including, but not limited to, paper, cardstock, plastic, fabric, metal, glass and combinations thereof. In some embodiments, the substrate (130) may be generic printing paper.

The first colored ink (105) may be an aqueous solution comprising a dispersion of a plurality of particles of a first pigment. Examples of suitable pigment particles include yellow pigments (e.g., PY74, PY128, PY155, PY218, or the like), magenta pigments (e.g., PR122, PV19, PR202, PR168, PR177, PR178, PR254, PR269 or the like), or cyan pigments (e.g., PB15:3, PB15:4, or the like). Pigment particles are available commercially, such as in aqueous dispersions having electrostatic dispersants which adhere to the outer surface of the pigment particles, thus stabilizing the dispersion as previously described. The pigment particles in the first colored ink have a first net zeta potential. The net zeta potential may in some embodiments correspond directly to the polarity of electrostatic dispersants used in conjunction with the pigment particles.

The second colored ink (110) may, like the first colored ink (105), be an aqueous solution comprising a dispersion of a plurality of particles of a second pigment. Examples of suitable pigment particles include yellow pigments, magenta pigments, or cyan pigments as previously mentioned. The dispersion of particles of the second pigment may include an electrostatic dispersant of the same polarity of the electrostatic dispersant used with the particles of the first pigment. In many cases, the first and second pigment dispersions may use the same electrostatic dispersant.

The second colored ink (110) also comprises a polarity-reversing amount of a surfactant, such that the particles of the second pigment comprise a net zeta potential opposite in polarity to the net zeta potential of the particles of the first pigment.

The first and second colored inks (105, 110) are configured to be printed together over a common surface (150) of the substrate (130). The first and second colored inks (105, 110) exhibit different colors from each other. Thus, the pigment in the first colored ink (105) is of a different color than the pigment in the second colored ink (110). When printed together the first and second colored inks (105, 110) form a composite color on the substrate (130).

As two inks with pigment particles of zeta potentials with opposite polarities printed together are understood to produce composite colors of enhanced saturation on generic media, the first colored ink (105) and the second colored ink (110) provide a highly saturated composite color when printed together by the ink dispensing device (140) on the substrate (130).

It should be understood that many methods and devices may be employed to deposit the first and second colored inks (105, 110) on the substrate (130). Examples of such possible methods and devices include, but are not limited to, inkjet, liquid electrophotography, bubble jet, photo pen, and other pen methods and devices, in addition to combinations thereof.

Figure 2:
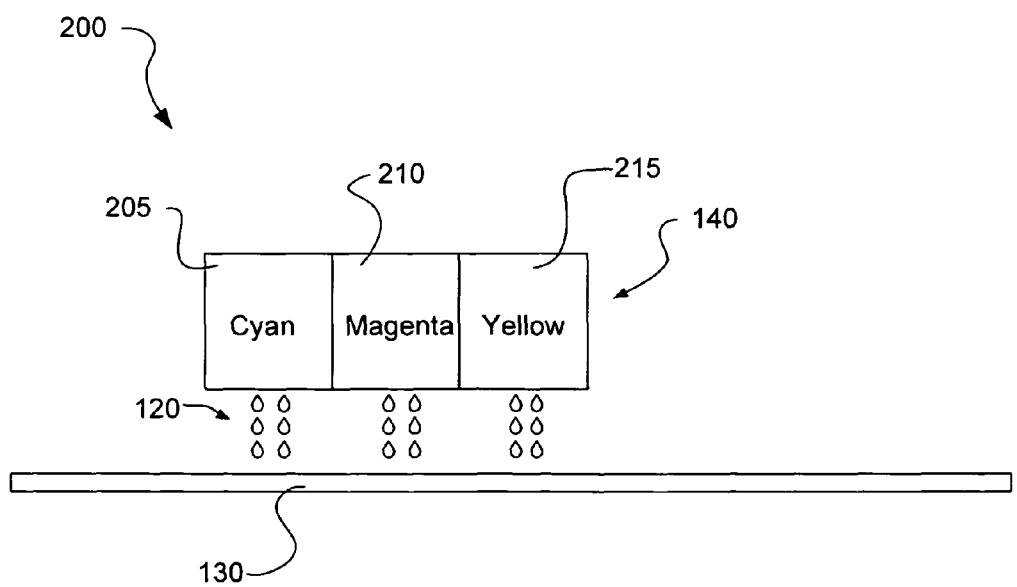
FIG. 2 is a diagram of an exemplary embodiment of a printing system according to principles described herein.

Referring now to FIG. 2, a printing system (200) in accordance with the present disclosure may include three separate colored inks (205, 210, 215) configured to be printed on a substrate (130). The three colored inks (205, 210, 215) comprise cyan, magenta and yellow inks, respectively. The cyan, magenta, and yellow set of inks is used in many printing systems currently available, and pigment dispersions for the formulation of these inks are commonly available commercially from suppliers.

In the embodiment shown, one of the colored inks (205, 210, 215) may comprise pigment particles having a net zeta potential of a first polarity and the other two of the colored inks (205, 210, 215) may comprise a polarity-reversing amount of surfactant such that their pigment particles have a net zeta potential opposite in polarity to the first polarity.

For example, the magenta colored inks (210) may comprise a dispersion of pigment particles having a negative electrostatic dispersant, thus incurring a negative net zeta potential on the surface of the magenta pigment particles. The cyan and yellow colored inks (205, 215) may comprise similar dispersions of pigment particles having negative electrostatic dispersants with the addition of a cationic surfactant. The cationic surfactant may be present in the cyan and yellow colored inks (205, 215) in amount such that the surfactant interacts with the pigment particles and electrostatic dispersants to produce a net positive zeta potential on the pigment particles.

In such a configuration, the magenta and yellow inks (210, 215) may be printed together to produce a composite red color. Because of the opposite polarities of the net zeta potentials in the magenta and yellow pigment particles, the composite red color has better color saturation on generic media than a composite red color printed with magenta and yellow pigments having the same polarity zeta potential.

The cyan and magenta inks (205, 210) may also be printed together to produce a composite blue color with enhanced generic media color saturation due to the opposite polarities of the net zeta potentials in the cyan and magenta pigment particles.

It is also to be understood that many composite color shades having enhanced generic media color saturation may be produced by printing two or more of the three colored inks (205, 210, 215) together in varying proportions.

In other embodiments, two of the colored inks (205, 210, 215) may be formulated with a dispersion of pigment particles having a net zeta potential defined by the polarity of the electrostatic dispersant and one of the colored inks (205, 210, 215) may additionally comprise a polarity-reversing amount of surfactant such that the net zeta potential of its pigment particles are opposite to the polarity of the electrostatic dispersant.

In still other embodiments, anionic surfactants may be used to reverse the polarity of the net zeta potential of pigment particles in at least one of the colored inks (205, 210, 215) comprising a positively charged electrostatic dispersant.

Figure 3:
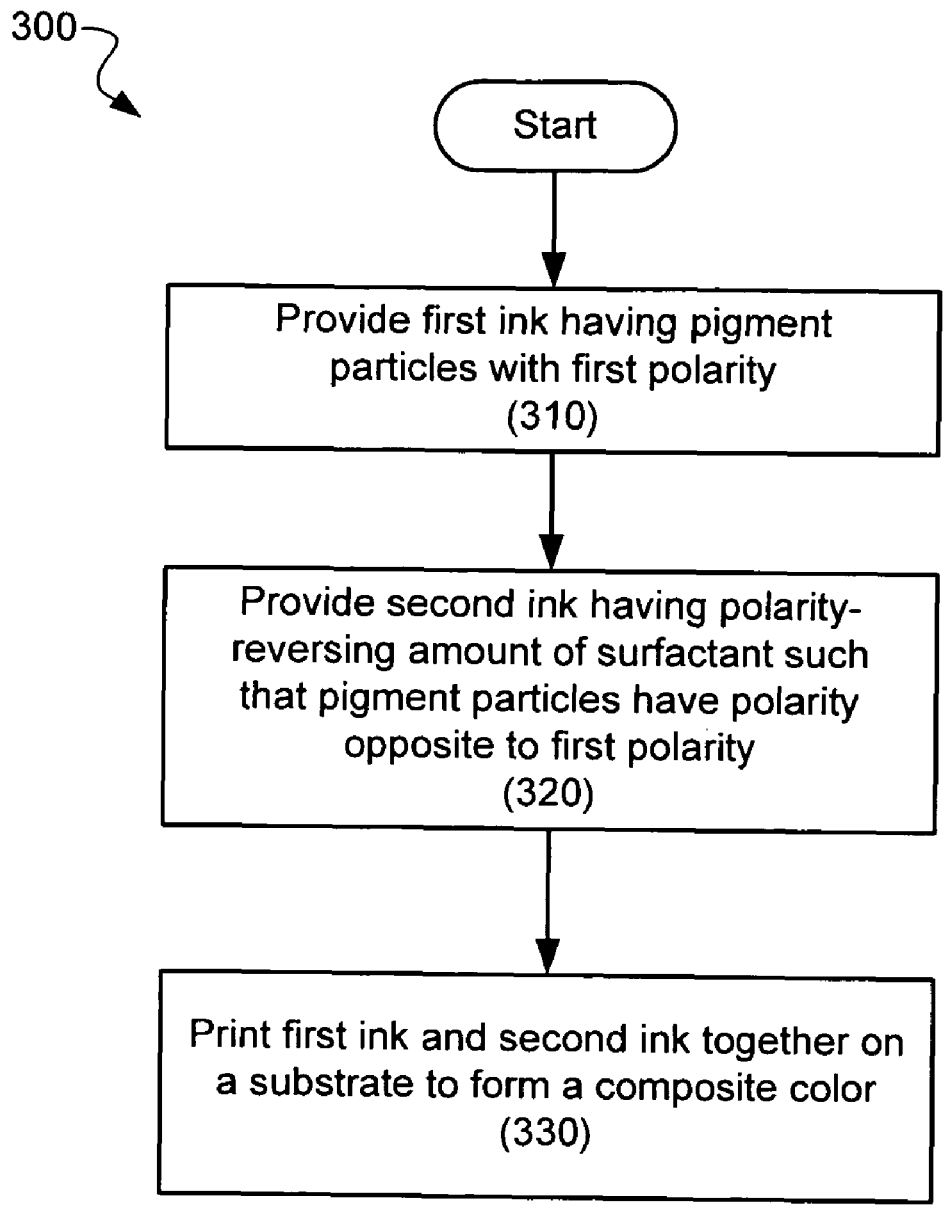
FIG. 3 is a flowchart illustrating an exemplary method of printing a composite color according to principles described herein.

Referring now to FIG. 3, an exemplary method (300) of printing a composite color with enhanced color saturation is shown.

A first colored ink is provided (step 310), the first ink having pigment particles of a first polarity. The polarity of the pigment particles may be the net zeta potential of the particles when in a liquid ink vehicle. In some embodiments the polarity of the pigment particles of the first ink is determined by the polarity of an electrostatic dispersant.

A second colored ink is also provided (step 320). The second ink includes a polarity reversing amount of surfactant such that pigment particles have a polarity opposite to the first polarity. For example, two colored inks may be formulated from commercially available pigment dispersions. The pigment dispersions may comprise electrostatic dispersants that render a net positive or negative zeta potential on the surface of the pigment particles. In the case that the second ink is formulated from a pigment dispersion having an electrostatic dispersant with a net positive charge, an anionic surfactant may be added to the second ink to reverse the polarity of the zeta potential of the pigment particles.

In embodiments where the second ink is formulated from a pigment dispersion having an electrostatic dispersant with a net negative charge, a cationic surfactant may be added to the second ink to reverse the polarity and give the pigment particles a net positive charge.

The first and second inks may be cyan, magenta, or yellow colored inks. The first ink and the second ink are printed (step 330) together on a substrate to form a composite color. When printed together, the opposite polarities of pigment particles in the first and second inks provide a composite color of enhanced color saturation on generic media such as plain paper.

In some embodiments, the first and second inks may be printed (step 330) together substantially simultaneously. In other embodiments, the first and second inks may be printed (step 330) together substantially sequentially, such as is the case in some liquid electrolithographic and inkjet printers for example.

In other embodiments, it is conceived that three or more colored inks may be printed together, at least two of which have charged pigment particles of opposite polarities. In such embodiments, at least one of the colored inks has the polarity-reversing amount of surfactant such that its pigment particles comprise an opposite polarity charge to the pigment particles of another of the colored inks. Non-limiting examples of composite colors that may be produced using cyan, magenta, and yellow inks include red, blue, and green.

It should be understood that the relative amount of the colored inks used when printed together (step 330) is variable according to the desired hue of the composite color, and that any desirable amount of the colored inks may be used to produce the hue.

Figure 4:
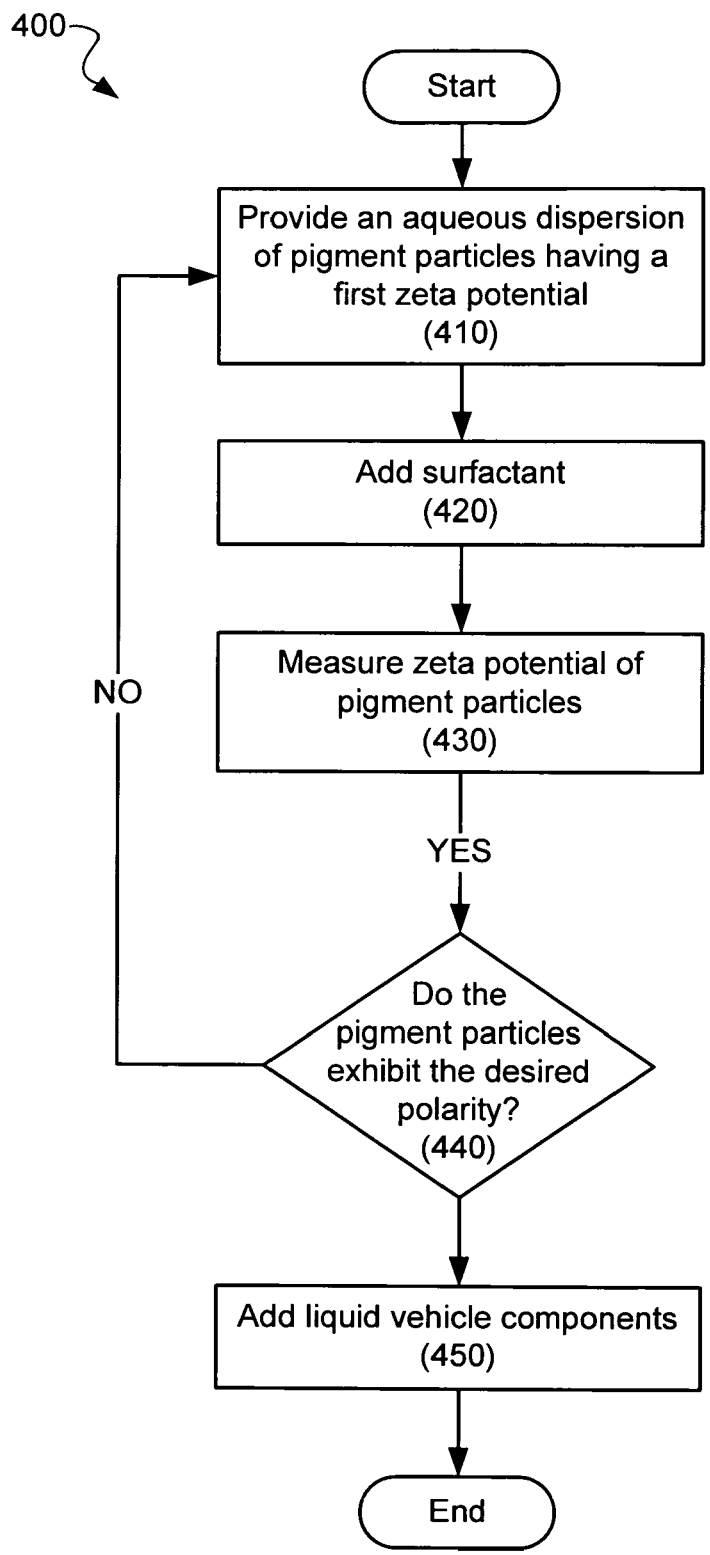
FIG. 4 is a flowchart illustrating an exemplary method of preparing a colored ink for use in printing composite colors according to principles described herein.

Referring now to FIG. 4, an exemplary method (400) of preparing a colored ink for use in printing composite colors is shown. The method (400) provides a process for reversing the polarity of the net zeta potential of pigment particles in an aqueous dispersion. A first colored ink prepared by this method (400) may be then printed together with a second colored ink comprising pigment particles having the same polarity of net zeta potential as the pigment particles in the aqueous dispersion of the first ink originally had prior to undergoing the method (400), and thus form a composite color. The composite color may be characterized by enhanced color saturation in generic media.

The method (400) includes providing (step 410) an aqueous dispersion of pigment particles having a first zeta potential. Many suitable aqueous dispersions may be used, and several are available commercially in the art. One non-limiting example is a pigment dispersion of the Cab-O-Jet® series, available commercially from Cabot Corp. The amount of pigment included in the dispersion may be adjusted according to the desired hue of primary and composite colors printed with the ink. Generally the formulated ink comprises pigment in quantities of less than 10% by weight. In some embodiments, pigment particles may be present in the ink at a weight percentage between 3% and 5%.

A surfactant is then added (step 420) to the dispersion and liquid ink vehicle. In embodiments where it is desired that the pigment particles in the ink dispersion ultimately comprise a positive net zeta potential, the surfactant is a cationic surfactant. In embodiments where it is desired that the pigment particles in the ink dispersion ultimately comprise a negative net zeta potential, the surfactant is an anionic surfactant.

Once the surfactant has been added (step 420) to the dispersion, the zeta potential of the pigment particles is measured (step 430). In some embodiments an apparatus such as the ZetaProbe from Colloidal Dynamics may use electroacoustic measurements to determine the zeta potential of the pigment particles. In other embodiments a Laser Doppler Velocimeter (LDV) may be used to quantify the net zeta potential of the pigment particles. The net zeta potential is then evaluated (step 440) to determine if the pigment particles exhibit a polarity opposite to the polarity the particles had previous to adding the surfactant (step 420). If the pigment particles exhibit the desired polarity, the process is complete. If the pigment particles do not exhibit the desired polarity (i.e. the pigment particles retain their original polarity), more surfactant is added (step 420) and the steps of measuring (step 430) and evaluating (step 440) the zeta potential of the pigment particles are repeated.

For example, if the net zeta potential of the pigment particles in the dispersion were originally negative, a cationic surfactant may be added (step 420) to the dispersion. The net zeta potential of the pigment particles would then be measured (step 430) to determine if the particles had acquired a net positive zeta potential. If the pigment particles did not exhibit a net positive zeta potential, more cationic surfactant would then be added to the dispersion and liquid vehicle (step 420) and the zeta potential of the particles would be evaluated (step 440) again.

Once the pigment particles of the dispersion exhibit the desired polarity, liquid ink vehicle components are then added (step 450) to the dispersion to create a suitable Ink formulation. These components may include, but are not limited to, diethylene glycol, 1,2-hexanediol, glycerol, LEG-1, Tergitol 15S7, Zonyl FSO, Proxel GXL, solvents, co-solvents, buffers, biocides, sequestering agents, viscosity modifiers, chelating agents, resins, additional surfactants, water, and combinations thereof. The additional ink components may add stability or added functionality to the ink mixture.

The preceding description has been presented only to illustrate and describe embodiments and examples of the principles described. This description is not intended to be exhaustive or to limit these principles to any precise form disclosed. Many modifications and variations are possible in light of the above teaching.

EXAMPLE

An example is provided herein to illustrate embodiments of the present disclosure. This example is for illustrative purposes only and in no way limits the scope of the principles described in the present disclosure.

Commercially available Cab-O-Jet (COJ) dispersions from Cabot Corp. were used to formulate cyan, magenta and yellow inks to print composite colors on plain paper. The specific dispersions used were COJ250C, COJ260M, and COJ270Y with cyan, magenta, and yellow colors, respectively. The percentage weights of cyan, magenta and yellow pigments used were 3%, 4%, and 4%, respectively. These particular dispersions comprise pigment particles having a negative net zeta potential. A test set of inks was prepared using the above dispersions with the addition of the cationic surfactant tetradecyltrimethylammonium bromide (TTAB) to the COJ250C and COJ270Y cyan and yellow dispersions. The cyan and yellow dispersions were titrated with TTAB to the point that the net zeta potential of the pigment particles had reversed from a negative polarity to its maximum positive value.

A control set of cyan, magenta and yellow inks was also prepared using the unmodified dispersions. Both the test and the control dispersion sets were prepared into inks with the formulation illustrated below in Table 1.

TABLE 1

| Ink Formulation | |
|---|---|
| Ingredient | Weight % |
| Pigment | 3-4% |
| Diethylene glycol | 2% |
| 1,2-Hexanediol | 4% |
| Glycerol | 5% |
| LEG-1 | 5% |
| Tergitol 15S7 | 1% |
| Zonyl FSO | 0.2% |
| Proxel GXL | 0.2% |
| Water | balance |

The polarity of the net pigment particle zeta potential in both the test and control ink sets is summarized in Table 2 below.

TABLE 2

| Polarity of Primary Colors | | | |
|---|---|---|---|
| Ink Set | Cyan | Magenta | Yellow |
| Control | − | − | − |
| Test | + | − | + |

Both ink sets were then used to print color print targets on Hewlett Packard "All In One" generic paper (part number HPAIO, non-ColorLok version), as well as a generic set of nine plain papers using a Hewlett Packard DeskJet 6540 printer. Thermal inkjet pen sets were used to print the targets. The composite color print targets included primary colors (cyan, magenta, and yellow) and composite secondary colors (red, blue, and green). In both the test and control ink sets, the red color was produced by printing the magenta ink with the yellow ink, the blue color was produced by printing the magenta ink with the cyan ink, and the green color was produced by printing the cyan ink with the yellow ink. The color saturation of both the control and test ink sets was then measured as $C^*/L^*$ in the CIELab color system. The saturation of the control and test sets of inks is summarized in Table 3 and Table 4 below, respectively.

TABLE 3

| Color Saturation Using the Control Set | | | |
|---|---|---|---|
| Color | Net Charge | Max $C^*/L^*$ | 9 Media Average |
| Cyan | − | 0.76 | 0.66 |
| Magenta | − | 0.89 | 0.89 |
| Yellow | − | 0.83 | 0.84 |
| Red | − − | 0.74 | 0.78 |
| Green | − − | 0.84 | 0.83 |
| Blue | − − | 0.76 | 0.79 |

TABLE 4

| Color Saturation Using the Test Set | | | |
|---|---|---|---|
| Color | Net Charge | Max $C^*/L^*$ | 9 Media Average |
| Cyan | + | 0.66 | 0.63 |
| Magenta | − | 0.87 | 0.88 |
| Yellow | + | 0.79 | 0.80 |
| Red | −+ | 0.90 | 0.90 |
| Green | ++ | 0.86 | 0.84 |
| Blue | −+ | 0.99 | 0.98 |

As evidenced by the data in Table 3 and Table 4, the composite colors red, green and blue had substantially enhanced and improved color saturation when the primary colors printed together were of opposite polarity over the case where the primary colors were of the same polarity.

What is claimed is:

1. A printing system comprising:
a substrate;
a first colored ink comprising particles of a first pigment, said particles comprising a first net zeta potential;
a second colored ink comprising particles of a second pigment;
electrostatic dispersant particles having a net surface charge; said electrostatic dispersant particles being adhered to surfaces of said particles of said first pigment and said particles of said second pigment such that said particles of said first pigment and said particles of second pigment have a net zeta potential of the same polarity; and a polarity-reversing amount of a surfactant, such that said particles of said second pigment comprise a second net zeta potential opposite in polarity to said first net zeta potential;

wherein said first and second colored inks are configured to be printed together over a common surface of said substrate to form a composite color.

2. The printing system of claim 1, wherein said particles of said first pigment and said particles of said second pigment having a net negative surface charge; said first net zeta potential comprises a negative polarity and said surfactant is a cationic surfactant; said polarity reversing amount of said cationic surfactant being added to said second colored ink such that said second net zeta potential is positive.

3. The printing system of claim 1, further comprising a third colored ink configured to be printed together with said first colored ink or said second colored ink on said substrate to form additional secondary colors.

4. The printing system of claim 2, wherein said third colored ink comprises particles of a third pigment and a polarity-reversing amount of a surfactant, such that said particles of said third pigment comprise a second net zeta potential opposite in polarity to said first net zeta potential.

5. The printing system of claim 4, wherein said third colored ink comprises substantially the same surfactant as said second colored ink.

6. The printing system of claim 3, wherein said third colored ink comprises particles of a third pigment comprising a third net zeta potential having the same polarity of said first net zeta potential of said particles of said first pigment.

7. The printing system of claim 3, further comprising highly saturated composite printed colors having a C*/L* of at least 0.90, the highly saturated composite printed colors comprising a combination of at least two inks having opposite polarity net zeta potentials, the combination of said at least two inks being selected from a set of inks comprising said first, second, and third colored inks, wherein said first, second, and third colored inks are selected from the group consisting of magenta ink, cyan ink, and yellow ink.

8. The printing system of claim 1, in which said polarity-reversing amount of surfactant has an opposite polarity of said electrostatic dispersant particles and adheres to said surfaces of said particles of said second pigment such that said particles of said second pigment comprise said second net zeta potential opposite in polarity to said first net zeta potential.

9. The printing system of claim 8, in which said first colored ink and said second colored ink comprise the same type of electrostatic dispersant particles.

10. The printing system of claim 9, in which said first net zeta potential is negative and said surfactant is tetradecyltrimethylammonium bromide.

11. The printing system of claim 1, in which said polarity reversing amount of said surfactant is an amount of surfactant which maximizes the second net zeta potential.

12. A printing system comprising:
a substrate;
a first colored ink comprising particles of a first pigment, said first colored ink comprising a first net zeta potential;
a second colored ink comprising particles of a second pigment, said particles of said second pigment having a charge of the same sense as said first net zeta potential; said second colored ink further comprising a first polarity-reversing amount of a surfactant, said first polarity reversing amount of surfactant being determined by titrating said second colored ink with said surfactant and testing a net zeta potential of said second colored ink, said first polarity reversing amount of surfactant comprising a quantity of said surfactant sufficient to reverse said net zeta potential of said second colored ink; and
a third colored ink comprising particles of a third pigment, said particles of said third pigment having a charge of the same sense as said first net zeta potential; said third colored ink further comprising a second polarity-reversing amount of a surfactant, said second polarity reversing amount of surfactant being determined by titrating said third colored ink with said surfactant and testing a net zeta potential of said third colored ink, said second polarity reversing amount of surfactant comprising a quantity of said surfactant sufficient to reverse said net zeta potential of said third colored ink;
wherein said first colored ink is a magenta ink with a negative net zeta potential, said second colored ink is a cyan ink with a positive net zeta potential, and said third colored ink is a yellow ink with a positive net zeta potential and wherein said first, second, and third colored inks are configured to be printed together over a common surface of said substrate to form composite colors, in which said composite colors comprise a red color, said red color being formed by combining said magenta ink with a negative net zeta potential potential with said yellow ink with a positive net zeta potential; said composite colors further comprising a blue color, said blue color being formed by combining said magenta ink with a negative net zeta potential with said cyan ink with a positive net zeta potential; in which said red color and said blue color have a C*/L* of at least 0.90.

* * * * *

UNITED STATES PATENT AND TRADEMARK OFFICE
CERTIFICATE OF CORRECTION

PATENT NO. : 7,926,929 B2  
APPLICATION NO. : 11/698246  
DATED : April 19, 2011  
INVENTOR(S) : Sundar Vasudevan Page 1 of 1

It is certified that error appears in the above-identified patent and that said Letters Patent is hereby corrected as shown below:

In column 9, line 25, in Claim 4, delete "claim 2," and insert -- claim 3, --, therefor.

In column 10, lines 44-45, in Claim 12, before "with" delete "potential".

Signed and Sealed this
Eighth Day of November, 2011

David J. Kappos
*Director of the United States Patent and Trademark Office*